Aug. 25, 1931.  A. M. CRAIG  1,820,269
PNEUMATIC GEAR SHIFT
Filed May 8, 1926  7 Sheets-Sheet 4
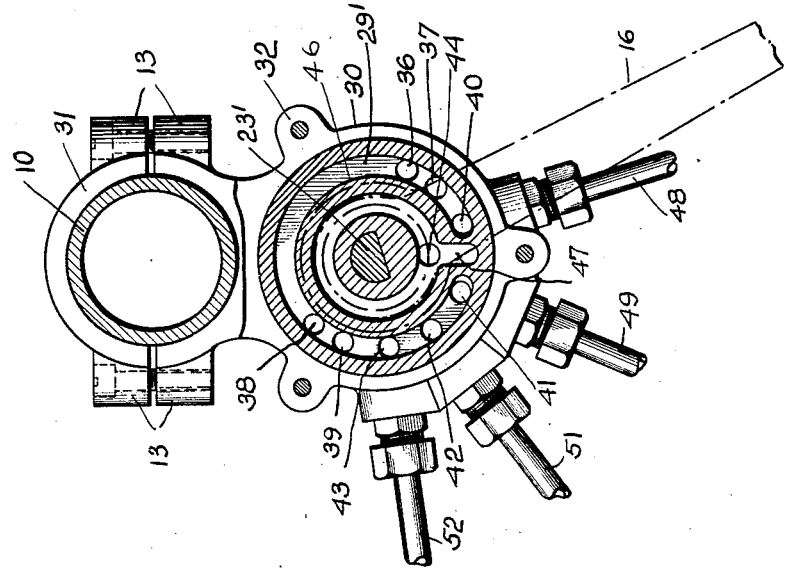
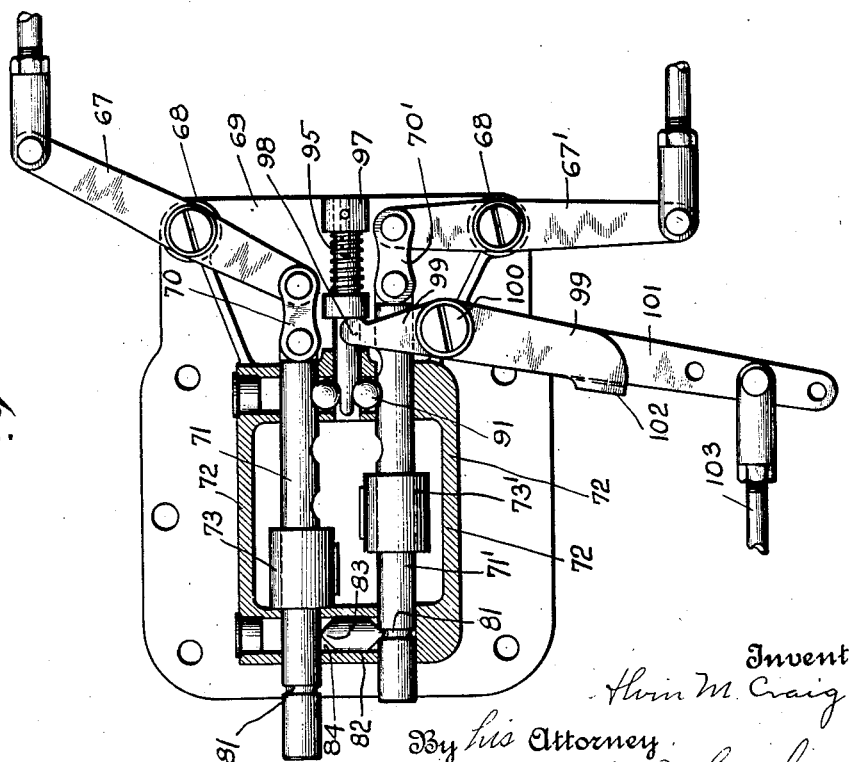

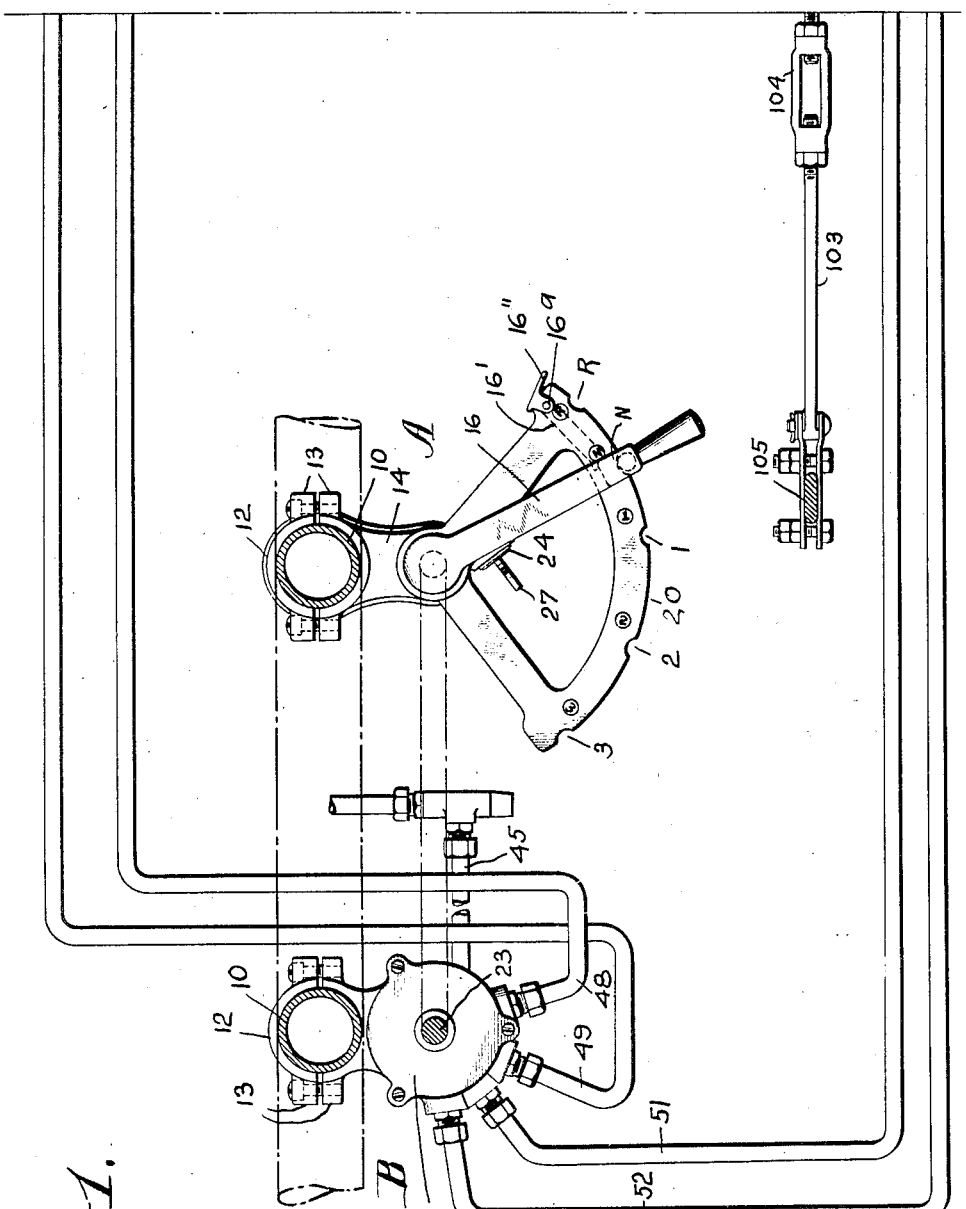

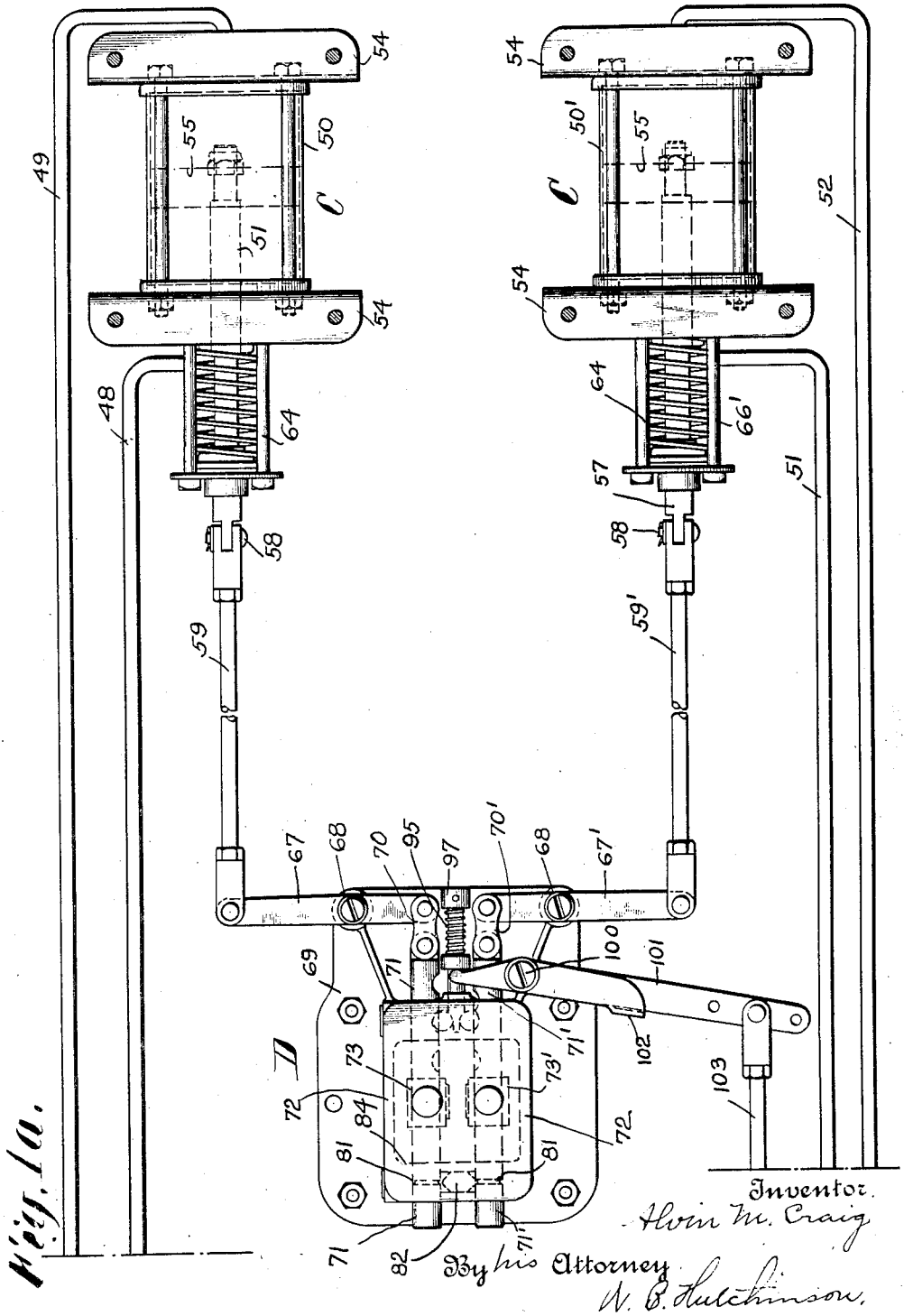

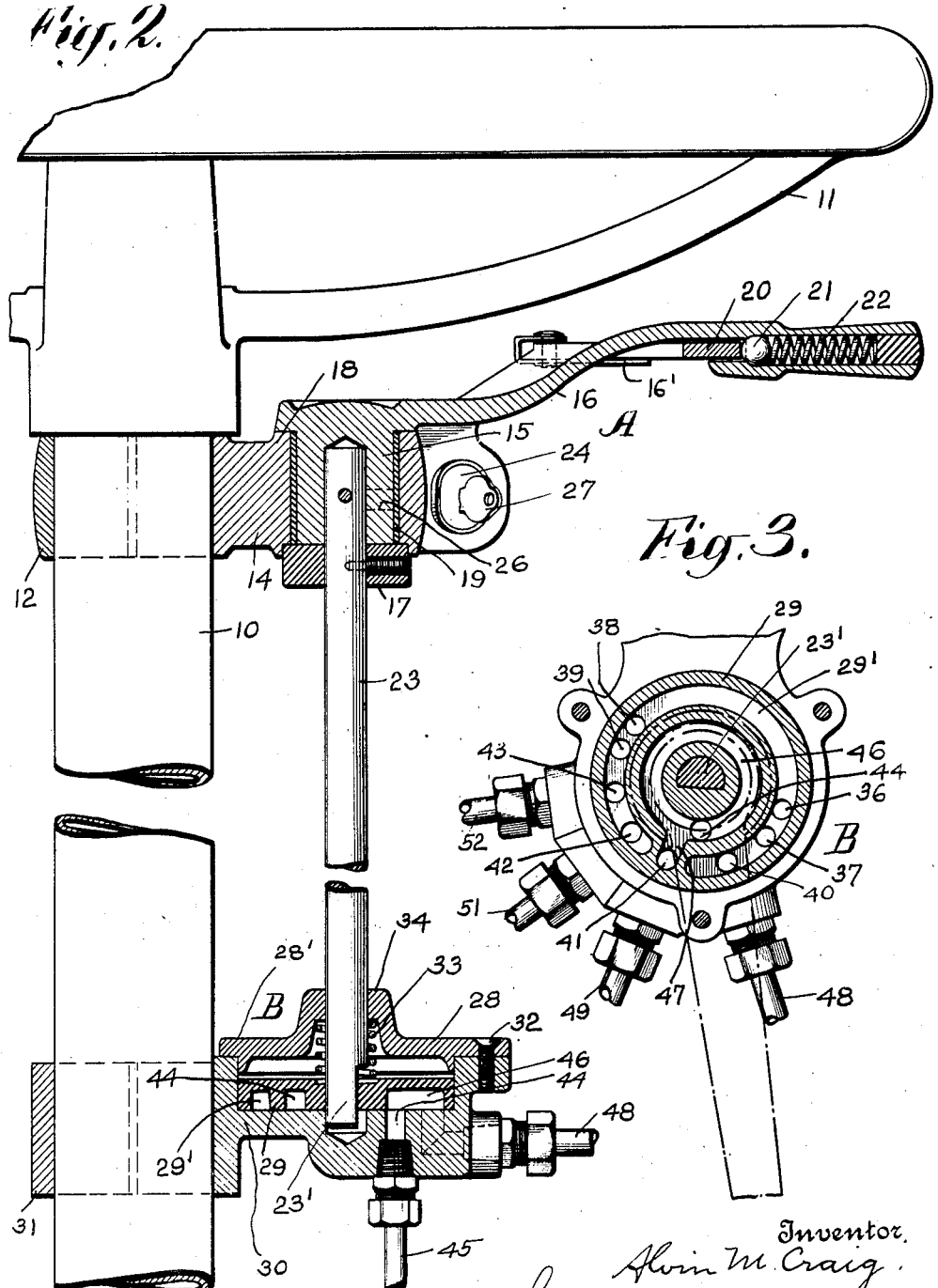

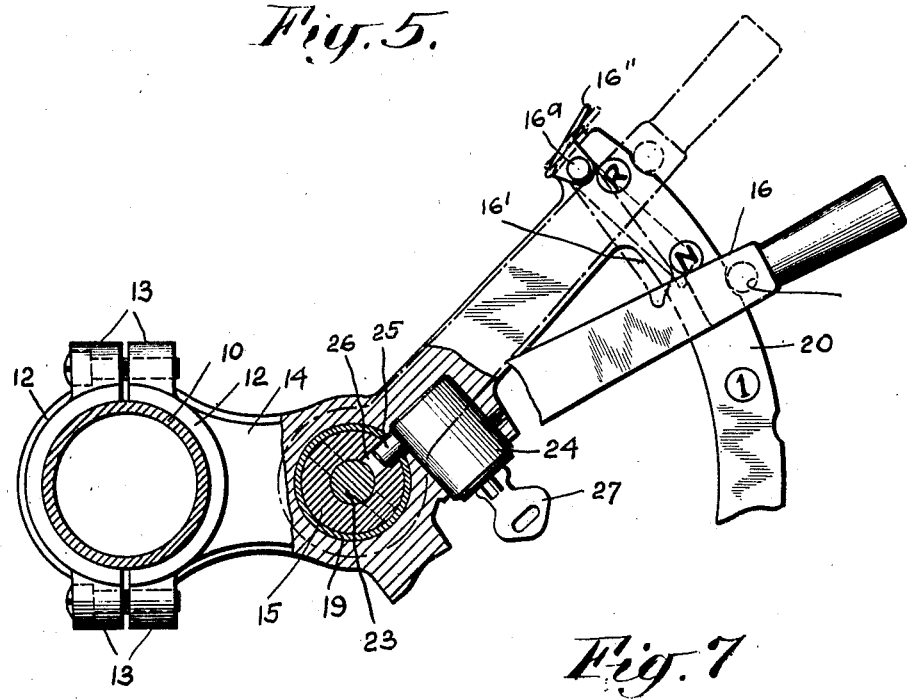
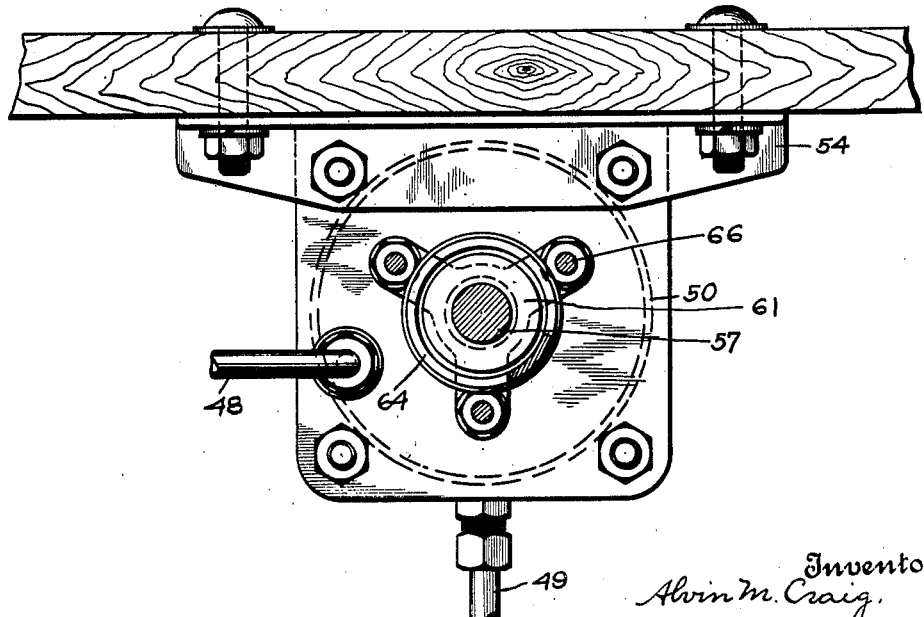

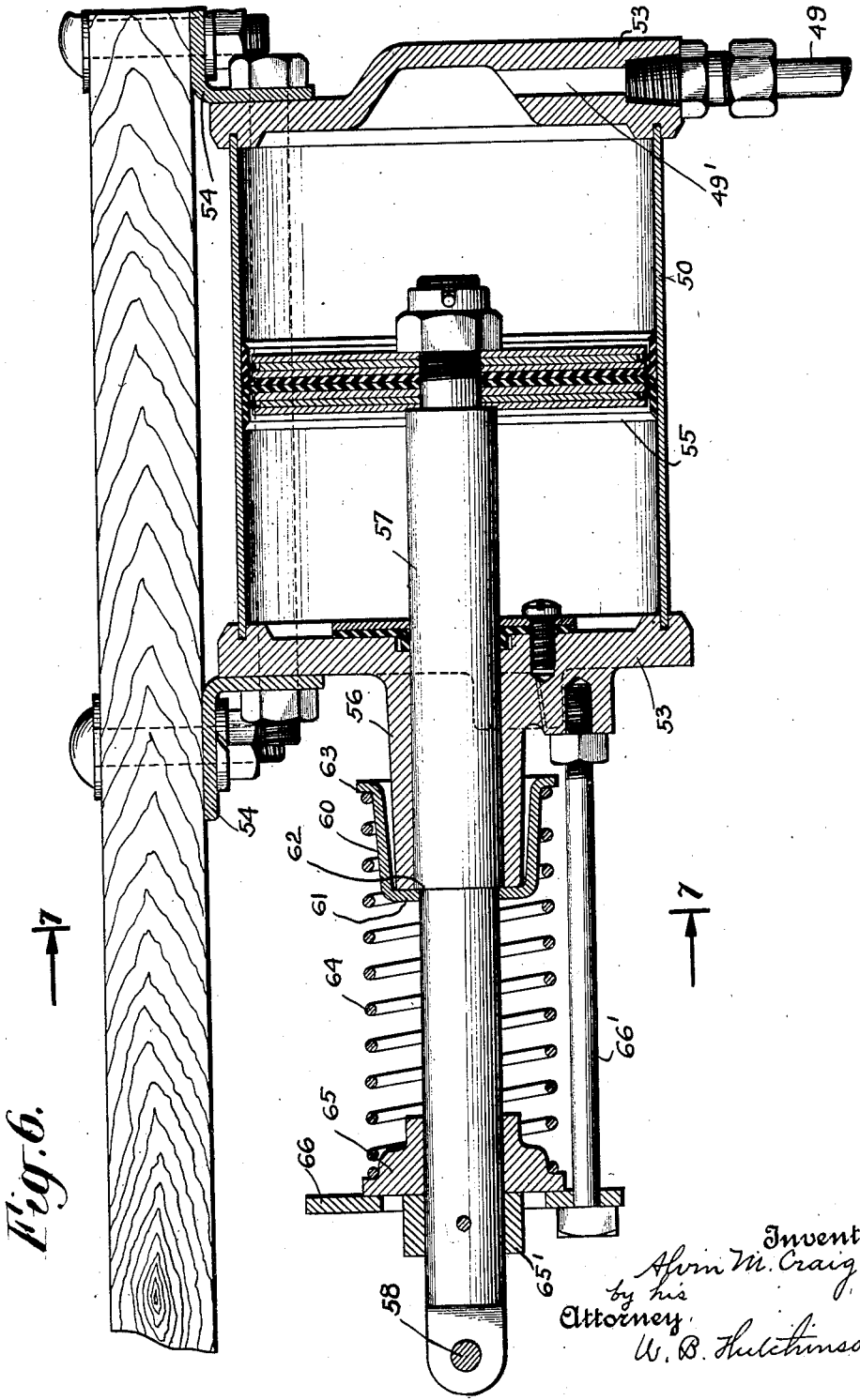

Aug. 25, 1931.    A. M. CRAIG    1,820,269
PNEUMATIC GEAR SHIFT
Filed May 8, 1926    7 Sheets-Sheet 7
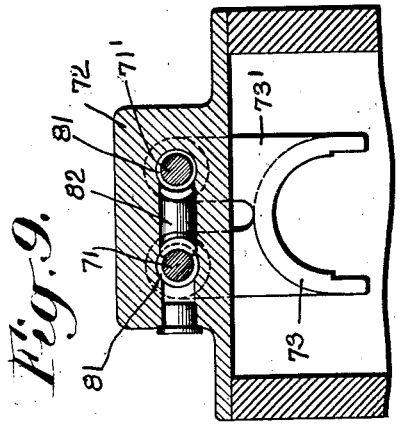
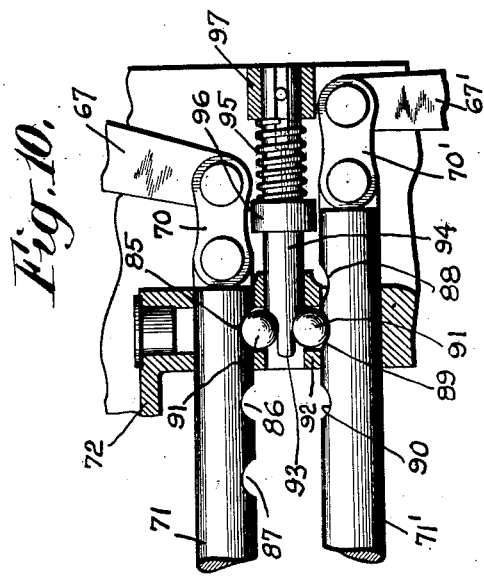
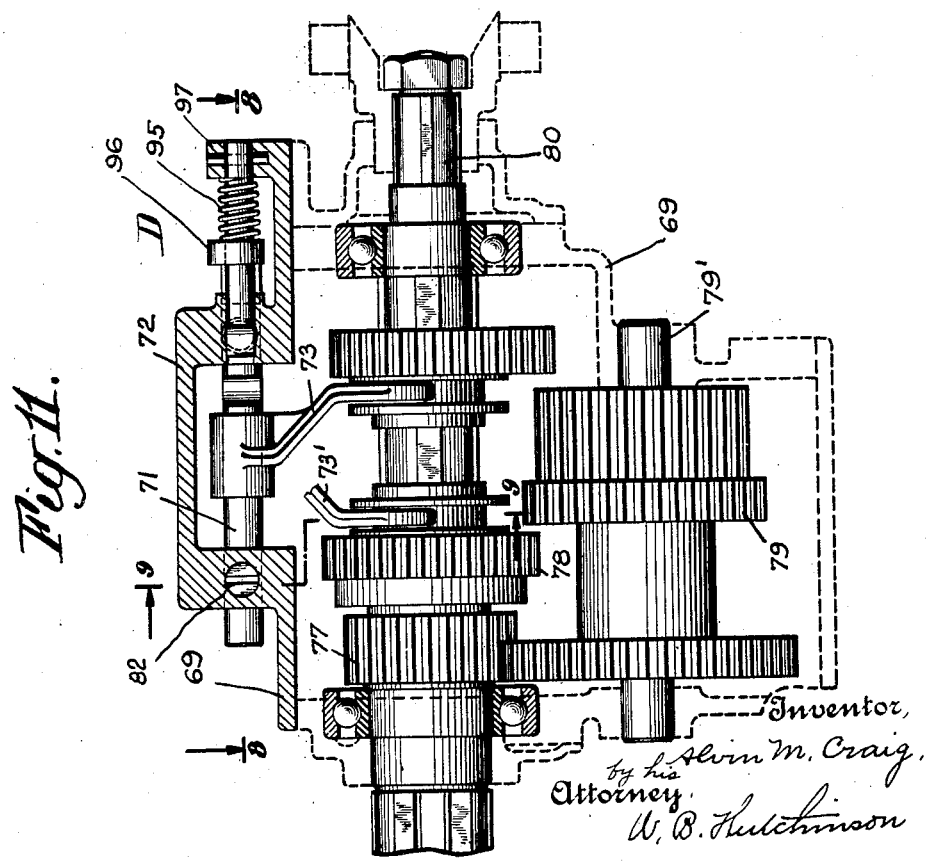
Inventor,
Alvin M. Craig,
by his
Attorney,
W. B. Hutchinson Patented Aug. 25, 1931

1,820,269

UNITED STATES PATENT OFFICE

ALVIN M. CRAIG, OF NEW HAVEN, CONNECTICUT, ASSIGNOR TO UNIVERSAL GEAR SHIFT CORPORATION, A CORPORATION OF DELAWARE

PNEUMATIC GEAR SHIFT

Application filed May 8, 1926. Serial No. 107,592.

My invention relates to improvements in pneumatic gear shifts adapted for use on motor cars and vehicles, and the object of my invention is to produce a practical reliable gear shift which occupies very little space, does away with the use of the ordinary hand lever, and operates to positively shift the gears so that they will slide with certainty and precision into the desired position. My invention is further intended to produce a structure which will automatically lock the shifting mechanism in each of its operating positions so that there will be no chance for accidental moving of the shift to any other position. The invention is further intended to produce a structure which is free when in neutral position to move to any desired position, and in which the movements of the shifting gears are produced by pistons operating in cylinders, and preferably connected with the suction side of the motor, or at least with a source of suction. The invention is further intended to arrange these operating pistons so that they will normally and positively be returned to neutral position after each movement and prior to another adjustment. The invention is intended to also provide automatic means for freeing the apparatus to the control of its pistons by the actuation of the starting clutch. The invention is also intended to provide a controlling mechanism including a lever or handle and a valve, in which the handle is arranged conveniently to the steering wheel of the machine and the valve is spaced apart and located near the floor, and in connection with this arrangement to provide a lock which will securely lock the controlling apparatus and therefore lock the machine. These and other advantages will appear more clearly from the following description.

Reference is to be had to the accompanying drawings forming a part of this specification, in which similar reference characters indicate corresponding parts in all the views.

Figure 1 is a sectional plan and development of the controlling part of the apparatus, the valve being placed to one side of its normal position to make the development clear.

Figure 1—a is a development and plan of the piston and gear mechanism.

Figure 2 is a broken enlarged detail sectional view of the controlling mechanism including the operating handle and control valve.

Figure 3 is a section on the line 3—3 of Figure 2.

Figure 4 is an enlarged view in sectional plan of the control valve and connections, showing the valve in neutral position.

Figure 5 is an enlarged detail sectional plan with parts broken away, illustrating the means of applying the lock.

Figure 6 is an enlarged detail longitudinal section of one of the operating pistons and its connections.

Figure 7 is a sectional elevation on the line 7—7 of Figure 6.

Figure 8 is a sectional plan on the line 8—8 of Figure 11 of the immediate gear shifting device.

Figure 9 is a detail of the gear case connections on the line 9—9 of Figure 11.

Figure 10 is an enlarged broken detail plan partly in section, of the clutch feed locking mechanism for the gear slip rods, and Figure 11 is a vertical section through the gear case showing the means for sliding the shifting gears.

The apparatus in its organization comprises a control handle and lock mechanism A, the controlling valve B which is spaced below the handle control, the operating cylinders and pistons C, and the gear shifting connections with the gear case D.

I have shown my apparatus in connection with a conventional steering rod 10 and wheel 11. The handle control A is arranged preferably just below the steering wheel 11 so that it may be conveniently operated by the driver, and as a convenient means of supporting this mechanism I use preferably a split collar 12 having opposed flanges 13 (see Figure 5) to facilitate its attachment to the steering rod, and this collar carries a rearwardly extending bracket 14 in which is vertically arranged the hub 15 of the control lever or handle 16. Immediately below the hub 15 is a collar 17 which extends slightly into the bracket 14, while the top flange 18 of the hub overlaps the bracket, and thus a tight joint is made. A bushing 19 is preferably inserted between the hub 15 and the opposed bracket walls. The handle 16 moves over a quadrant 20 which is supported on the bracket 14, and as shown in Figure 1 this quadrant has notches in its edge marked, in Figure 1, "R—1, 2 and 3", to show that when the handle is opposite these notches the apparatus will be in position to shift the gears into reverse, first, second or third speed positions. As a convenient means of temporarily fixing the handle in any of these positions, I provide a ball 21 which is mounted in the inner part of the handle (see Figure 2) and which rides on the edge of the quadrant, and fits in the several notches, being pressed to position by a spring 22 in the handle. Thus the ball serves to securely hold the handle in any desired position, but does not fasten it so securely but that it may be readily moved by hand, the ball riding back against the tension of its spring.

By reference to Figures 1 and 5 it will be noted that the notches 1, 2 and 3, representing corresponding speeds, are in one group, so that the operating handle 16 may be moved freely from one to the other, but the reverse notch R is spaced apart from the others, and the handle or lever 16 is prevented from being moved to the reverse position by a detent 16' which normally springs into the path of the handle, and which has a thumb piece 16" at the end, the detent being pivoted as shown at 16ª. The object of this is to prevent any accidental moving of the handle to reverse position. If the driver should be confused and try to do this, the detent 16' would prevent the movement until the driver realizing that he really needed the reverse position, would manually release the detent by pressing on the thumb piece 16".

The handle control mechanism A is spaced apart from the control valve B, the latter being preferably near the toe board of the car and connected with the handle by a valve rod 23 which lies near and parallel with the steering rod 10. The handle is preferably flattened at its lower end portion as shown at 23' in Figures 2 and 3, to be sure that it makes the right connection with the control valve 29, as presently described.

Before describing the control valve in detail, attention is called to the fact that the arrangement of the handle control A makes it a simple matter to effectually lock the car against theft.

A lock 24 can be placed in the bracket 12 (see Figure 2) and its bolt 25 (see Figure 5) can be made to enter a recess 26 in the hub 15, and the bolt can be operated by a suitable key 27. Thus the control handle 16 can be locked to the bracket 14, and the car cannot be controlled until the lock is released. The location of the lock is such that it cannot be readily tampered with, and if sufficient force is used to smash the lock, it would disrupt the car control so that the latter could not be operated. The lower end of the valve rod 23 extends through the top 28 of the valve casing, and connects with the rotary valve 29 as shown best in Figure 2. The top 28 has preferably a flange 28' which fits in the casing 30 of the valve, this being carried preferably on the steering rod, and connecting therewith by a collar 31 similar to the collar 12 already described. The top 28 is held to its casing 30 by screws 32 or the like, and the valve is pressed downward upon its flat seat by a spring 33 (see Figure 2) which is coiled around the lower end of the rod 23 and held in the bonnet 34 of the top 28, while its lower end seats against the valve as shown at 35. Thus the valve is held closely to its seat, and attention is further called to the fact that the valve by reason of its connection with the suction pipe hereinafter referred to, is drawn by suction against its seat also, so that there is practically no possibility of the valve being loose.

Just below the valve 29, the casing is formed into a flat seat through which are groups of ports (see Figures 3 and 4). Two of these ports 36 and 37 are open to the atmosphere on one side of the valve, while the ports 38 and 39 are open to the atmosphere on the opposite side of the valve. The valve casing is also provided with ports 40, 41, and 42 arranged in the same arc with the ports 36, 37, 38 and 39 and connecting with pipes leading to the operating cylinders and pistons, as presently described. All these aforesaid ports register with the channels 29' spaced apart in the lower face of the valve 29, to provide for exhausting or bleeding the cylinders as hereinafter described.

Through the casing and within the arc formed by the ports above referred to, is another port 44 connecting with the pipe 45 which leads to a source of suction, preferably the suction side of the car motor, and most conveniently with the manifold. The valve 29 has a channel 46 (see Figures 3 and 4) which is formed in the lower face of the valve and is concentric with the arc of the ports already referred to, this channel having an offset 47 (see Figures 3 and 4) adapted to register with the several ports 36 and 43 already described, while the channel 46 registers with the port 44 of the exhaust or suction pipe.

The valve controls the connection with the operating pistons shown in Figure 1—a, and to this end the port 40 connects by a pipe 48 with the reverse end of a piston 50, while the port 41 corresponding to the first speed position, connects with the opposite end of said cylinder, so that the cylinder 50 has its piston arranged to move the gear shift either to reverse or first speed position. The ports 42 and 43 connect by pipes 51 and 52 with appropriate ends of the cylinder 50' which is arranged opposite and spaced apart from the cylinder 50, the cylinders being conveniently supported beneath the car and from its framework.

Referring to Figure 6 it will be seen that each cylinder is provided with suitable cylinder heads 53, and is supported by means of flanges 54 attached to the cylinder heads and connected preferably by bolts to the framework of the car. In Figure 6 I have shown a convenient means of making pipe connections with the cylinders, and as here illustrated, the cylinder 50 has a pipe 48 connected directly through one of the cylinder heads, as better shown in Figure 7, while the pipe 49 connects through the port 49' in the cylinder head.

It will be seen from the foregoing description that when suction is applied to the piston 55 at one end of the cylinder 50, it will move in one direction, and when it is applied to the opposite end of the cylinder, the piston will move in the opposite direction. In order that the piston may be dependable and work to the best advantage, it is desirable to have it automatically come to a neutral or central position after each adjustment of the valve and the gear shift. To this end the arrangement shown in Figure 6, or one substantially similar in operation is used. One of the cylinder heads has a boss 56 through which the piston rod 57 extends, and the piston rod is at its outer end pivotally connected as shown at 58 with a connecting rod 59 operating the slip rod of the gear shift, as hereinafter described. Sitting over the outer end of the boss 56 is a thimble 60 having an inturned flange 61 which overlaps the shoulder 62 on the piston rod 57, while at the other end of the thimble 60 is a flange 63 against which seats one end of the compression spring 64 which also seats against a collar 65 which is loose on the piston rod. Under the influence of compression, the spring 64 and collar 65 are pressed against the washer 66 which is held at a predestined distance away from the cylinder head 53 by the bolts 66'. The spring 64 will normally hold the piston 55 in neutral position so that, for example, if the suction in the cylinder is applied to the left hand end of the cylinder as shown in Figure 6, the piston 55 will move to the left against the tension of the spring 64 through the medium of the shoulder 62, flange 61, thimble 60 and flange 63, thus compressing the spring 64, and when the suction is removed the spring will return the piston and connected parts to neutral position. If, however, the piston 55 is moved to the right, it will through the medium of the parts 65 and collar 65' which is pinned to the piston rod 57, compress the spring 64 from the opposite direction, and when the suction is removed the pressure of the spring will likewise return the piston 55 to neutral position.

The connecting rods 59—59' of the cylinders 50 and 50' (see Figure 1—a) are connected at their forward ends to levers 67—67', each being pivoted as shown at 68 on the casing 69 of the shift gears, and the inner ends of the levers 67—67' connect by means of links 70—70' with the parallel slip rods 71—71' (see Figure 8) which operate the forks of the gear case. These slip rods move in the top extension 72 of the gear casing 69, the slip rod 71 carrying the fork 73 and the rod 71' carrying the fork 73'. The rod 73 actuates the slide gears 74 and 76 so as to bring them into mesh with the gears 75 or reverse gear not shown, thus controlling the reverse and first speeds, while the fork 73' moves the gear 78 to have it engage with the gear 79 or another gear 77, thus controlling the second or third speeds. The gear mechanism is not shown in detail because it has nothing to do with the invention, and can be any desired gear arrangement in which sliding gears control the speeds and directions. I have shown the general arrangement in which the gears are arranged on shafts 79' and 80 as usual.

To provide for locking the slip rods 71—71' in their various operating positions, and to permit them to be moved when in neutral position, a drift lock is provided, and to this end the slip rods are provided with grooves or recesses 81 extending around them, and when the apparatus is in neutral position these grooves 81 are opposite each other as shown in Figure 1—a. The grooves register with the drift block 82 having a raised central portion 83 adapted to enter the grooves 81, and held loosely in a guideway 84 (see Figure 8). When, however, one of the slip rods is moved lengthwise, which can be freely accomplished from neutral position, the enlarged part 83 of the drift block 82 will enter one of the grooves and bear against the face of the opposite slip rod. For example, in Figure 8 the slip rod 31 has been moved to the position of first speed, and therefore the block 82 bears against the face of the rod 71, but locks into the groove 81 of the rod 71' so that the latter cannot be moved.

Near their opposite ends from the grooves 81, the slip rods 71—71' are provided with concave recesses as follows. In the rod 71 are recesses 85, 86 and 87, and in the rod 71' are corresponding recesses 88, 89 and 90 (see Figure 10). These recesses are engaged by opposed balls or rollers 91 which are held in a suitable guide way 92, and they are forced into opposed recesses when the latter are in registry by a wedge or nose 93 on the slide block 94, so that the rollers or balls 91 also serve to lock the slip rods 71 and 71'.

The block 94 is, however, moved when the clutch lever is operated to start the car, as presently described, thus releasing the balls 91, and leaving the slip rods to the action of the valve mechanism B, as presently described. To this end, that is to provide for releasing the slide block 94, the latter is provided with a collar 96 behind which is a spring 95 (see Figure 10) arranged between the collar 96 and a bearing or abutment 97. The rounded end 98 of a dog 99 fits against the inner face of the collar 96. This dog is pivoted as shown at 100 on the same pivot with the lever 101 (see Figure 8) and has a flange 102 lying over one side of the lever 101. The latter connects by a rod 103 which is adjustable by a turnbuckle 104 or the like (see Figure 1) with the clutch lever 105 which is arranged as usual in motor vehicles. Thus when the rod 103 is pulled forward by the lever 105, which operates the standard clutch in the usual way, the lever 101 is pulled forward thereby moving the dog 99 and forcing the collar 96 and slide block 94 back against the tension of the spring 95 and releasing the rollers 101 from the slip rod.

Assuming that the valve B is in neutral position as shown in Figure 4, and the cylinder pistons 55 will also be in neutral position as shown in Figures 1—a and 6, the grooves 81 will be in registry as in Figure 1—a, and the rollers or balls 91 only will be locked in the recesses of the slip rods 71—71'. Now if the handle 16 is moved from the position shown in Figures 1 and 4 to the next left hand notch 1 for first speed, the valve 29 will be turned to the position shown in Figure 3, bringing the port 44 of the exhaust or suction pipe 45 into registry with the offset 47 and port 41 of the pipe 49. This will cause the air to be exhausted from the right hand end of the cylinder 50, while the air will be admitted to the other side of the piston through the pipe 48, the port 40, the channel 29', and the ports 36 and 37. The rod 59 of the piston 50 will be pulled to the right, the lever 67 tilted as shown in Figure 8, and the slip rod 71 moved to the left and the rod 71' locked by the block 82. The foregoing action will cause the fork 73 to shift the gears in the case 69 for first speed, meanwhile the driver will have moved the clutch lever 105 to release the clutch, thus pulling forward the rod 103 and lever 101, moving the dog 99, and pushing back the collar 96 and slide block 94 so as to release the slip rods to the foregoing action. If the driver wishes to move the gears to reverse position, he will throw the handle 16 to the right (see Figure 1), but before doing so will have to release the detent 16', whereupon the lever 16 can be moved to the right, bringing the offset 47 of the channel 46 opposite the port 40 and opening the pipe 48 to suction, while at the same time the pipe 49 will bleed through the port 41 and one of the channels 29' and ports 38 and 39. During this action the slip rod 71 will be returned first to neutral position and then to the position to move the fork 73 and its connected gear to position to reverse the car.

The foregoing illustrations in connection with the drawings, especially Figures 2, 3 and 4, will make it clear that in every instance the operating parts of the valve and the pistons are returned first to neutral position, and that when the valve is turned to position to attain any desired shift of gears, that is any desired speed, the appropriate cylinders will be exhausted on one side and bled to air on the other, so that the movement is smooth and certain, and the automatic locks described in detail prevent any possible mistake or accident, even though the driver were somewhat confused. Attention is called to the fact that the mechanism does not operate until the clutch is released and the rollers 91 freed from the slip rods 71 and 71'. This makes it possible to operate the device in two ways, and sometimes one is desirable and sometimes the other. One way is to first select the speed or movement desired by means of the handle 16 and connected valve, which will apply suction to a piston and put all the connected parts in operative position, and then release the clutch which will cause the slide block 94 to move back as described and release the rollers 91 and slip rods 71 or 71' to the action of its operating piston. The other way is to first release the clutch and unlock the rollers 91 from the slip rods 71 and 71' and then move the handle 16 and valve 29 so as to operate the piston and gears as desired. It will be noticed further that the arrangement is such as to move the gears with certainty, smoothness and precision, and with less chance of accident than when a hand lever is employed to shift the gears, while the space occupied by the lever in the usual car is left free.

I claim:—

1. The combination with a sliding of a gear shift cylinder and its piston, a boss on one end of the cylinder, a piston rod sliding thru the boss, a thimble slidably mounted on said piston rod, means on said piston rod to engage said thimble and limiting its sliding an abutment centered with and fixedly spaced from said boss, a collar slidably mounted upon said piston rod and limited in its outward movement by said abutment, means on said piston rod adapted to engage said collar, and a coil spring between said thimble and said collar operating normally to keep them separated.

2. The combination with a sliding gear shift of a cylinder and a piston and piston rod, operative to shift the gears of the car, means to center the piston in the cylinder, said means comprising flanged members slidably mounted upon said piston rod, a coil spring separating said flanged members, projections upon said piston rod limiting the separation of the flanged members, and a pair of rigidly spaced abutments external to said flanged members, each abutment limiting in one direction the axial movement of its adjacent flanged member.

3. The combination with a change gear transmission in which a pair of power members are moved relative to each other to operative and non-operative positions, of means for moving one of said members to its operative and non-operative positions and for positively immobilizing the moving member in its non-operative position, comprising an element operatively connected to said moving member, a pair of spaced stops on said element, spaced means movably mounted on said element, said spaced means limited in their separation by said stops, resilient means for urging said spaced means into separated relationship, a second pair of spaced stops limiting the separation of said spaced means, said second pair of spaced stops being fixed, and releasable means for moving said moving member to operative position.

4. The combination with a change gear transmission in which a power member is relatively moved between spaced power members into operative relationship with either spaced power member and is relatively moved to an inoperative position between said spaced power members, of means for moving said power member in either direction into alternative engagement with said spaced power members and means for returning said moving member and stopping it in non-operative position, said last mentioned means comprising an element operatively connected to said moving member, a pair of spaced stops on said element, spaced means movably mounted on said element, said spaced means limiting in their separation of said stops, resilient means urging said spaced means into separated relationship, and a second pair of spaced stops limiting the separation of said spaced means, said second pair of spaced stops being fixed.

In testimony whereof, I have signed my name to this specification this 7th day of April, 1926.

ALVIN M. CRAIG.

CERTIFICATE OF CORRECTION.

Patent No. 1,820,269.  Granted August 25, 1931, to

ALVIN M. CRAIG.

It is hereby certified that error appears in the printed specification of the above numbered patent requiring correction as follows: Page 4, line 32, strike out the word "only"; same page, line 113, claim 1, strike out the words "one of" and insert the same before the word "cylinder" in line 114; page 5, line 46, claim 4, for "limiting" read limited; and that the said Letters Patent should be read with these corrections therein that the same may conform to the record of the case in the Patent Office.

Signed and sealed this 27th day of October, A. D. 1931.

M. J. Moore,
Acting Commissioner of Patents.

(Seal)

CERTIFICATE OF CORRECTION.

Patent No. 1,820,269.                               Granted August 25, 1931, to

ALVIN M. CRAIG.

It is hereby certified that Certificate of Correction issued October 27, 1931, was erroneously drawn as to lines 113 and 114, claim 1, and that these lines should read "The combination with a sliding gear shift of a cylinder and its piston, a boss on"; and that the said Certificate should be read with this correction therein that the same may conform to the record of the case in the Patent Office.

Signed and sealed this 16th day of February, A. D. 1932.

(Seal)                                                          M. J. Moore,
Acting Commissioner of Patents.